US007796820B2

(12) United States Patent
Simon et al.

(10) Patent No.: US 7,796,820 B2
(45) Date of Patent: Sep. 14, 2010

(54) METHOD FOR EVALUATION AND STABILIZATION OVER TIME OF CLASSIFICATION RESULTS

(75) Inventors: Stephan Simon, Sibbesse (DE); Sebastian Lindner, Garbsen (DE); Henning Voelz, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1161 days.

(21) Appl. No.: 10/573,221

(22) PCT Filed: Sep. 3, 2004

(86) PCT No.: PCT/EP2004/052027

§ 371 (c)(1), (2), (4) Date: Mar. 24, 2006

(87) PCT Pub. No.: WO2005/034062

PCT Pub. Date: Apr. 14, 2005

(65) Prior Publication Data

US 2007/0036428 A1     Feb. 15, 2007

(30) Foreign Application Priority Data

Oct. 2, 2003 (DE) ................................. 103 45 948

(51) Int. Cl.
    *G06K 9/64* (2006.01)
(52) U.S. Cl. ................... 382/224; 382/118; 382/143; 709/200
(58) Field of Classification Search ................. 382/159, 382/224, 118, 143; 367/135; 701/301; 702/185; 706/20; 709/200; 324/457; 707/4; 715/234
See application file for complete search history.

(56) References Cited

U.S. PATENT DOCUMENTS 3,824,532 A * 7/1974 Vandierendonck .......... 367/136
5,201,047 A * 4/1993 Maki et al. ..................... 1/1

(Continued)

FOREIGN PATENT DOCUMENTS

DE     42 37 721     5/1994

(Continued)

OTHER PUBLICATIONS

Ryudo Nakagawa u.a., "Objekterkennung mittels Eigenraum verfahrens, durch die ein unbekanntes Objekt lernbar ist", 2002 IEICE General Conference (Information/System 2), Japan, Institute of Electronics, Information and Communication Engineers, Mar. 7, 2002.

*Primary Examiner*—Daniel G Mariam
*Assistant Examiner*—Aklilu k Woldemariam
(74) *Attorney, Agent, or Firm*—Kenyon & Kenyon LLP

(57) ABSTRACT

Classification methods are described that proceed in computer-assisted fashion, and in particular a method for evaluation and stabilization over time of classification results is described in which objects to be classified are sensed using sensors over a period of time, and are repeatedly classified with the inclusion of specific quality parameters for each object class. To ensure better classification reliability, the following steps may be carried out: a) increasing the value of the confidence parameter if a subsequent classification confirms the result of a previous classification; b) decreasing the value of the confidence parameter if a subsequent classification does not confirm the result of a previous classification; and c) generating a final classification result including the confidence parameters that have been increased or decreased in value.

16 Claims, 3 Drawing Sheets

U.S. PATENT DOCUMENTS

| | | | | |
|---|---|---|---|---|
| 5,612,928 A | * | 3/1997 | Haley et al. | 367/11 |
| 5,640,464 A | * | 6/1997 | Ebel et al. | 382/143 |
| 5,675,710 A | * | 10/1997 | Lewis | 706/12 |
| 6,192,360 B1 | * | 2/2001 | Dumais et al. | 1/1 |
| 6,622,134 B1 | * | 9/2003 | Sorkin | 706/20 |
| 6,976,207 B1 | * | 12/2005 | Rujan et al. | 715/234 |
| 2001/0005821 A1 | * | 6/2001 | Ottosson | 702/185 |
| 2002/0012467 A1 | * | 1/2002 | Shiratani | 382/224 |
| 2002/0165839 A1 | * | 11/2002 | Taylor et al. | 706/20 |
| 2003/0005030 A1 | * | 1/2003 | Sutton et al. | 709/200 |
| 2004/0062435 A1 | * | 4/2004 | Yamaoka et al. | 382/159 |
| 2004/0213439 A1 | * | 10/2004 | Blake et al. | 382/118 |
| 2005/0122118 A1 | * | 6/2005 | Zank et al. | 324/457 |

FOREIGN PATENT DOCUMENTS

| | | |
|---|---|---|
| DE | 195 42 871 | 11/1996 |
| EP | 0 940 792 | 9/1999 |
| JP | 64007276 | 1/1989 |
| JP | 10011575 | 1/1998 |
| JP | 2001174551 | 6/2001 |

* cited by examiner

METHOD FOR EVALUATION AND STABILIZATION OVER TIME OF CLASSIFICATION RESULTS

BACKGROUND INFORMATION

The present invention relates to a method and system for evaluating classification results from classification methods which proceed in computer-assisted fashion and in which objects to be classified are sensed using sensors over a period of time, and are repeatedly classified with the inclusion of specific quality parameters for an object class. A quality parameter of this kind is a parameter number or another qualifying indication within a preselected range, and is expressive of the certainty that the object belongs to the particular object class and not to a different object class.

Observations of objects are evaluated today in many application sectors, e.g., in machine vision in industrial production processes, in safety-related applications, for sensing the surroundings of vehicles, etc. These observations are furnished by measurement devices that can comprise, for example, one or more sensors that in some cases is different, e.g., radar, ultrasound, video in the visible and infrared region, lidar, laser, range imager.

One goal when processing object data obtained in this fashion is classification. "Classification" is understood to be the allocation of objects to specific object classes. A class serves to describe multiple objects that are considered, on the basis of similar features, to belong together. Classification systems for the assignment of objects to object classes are used, for example, in industrial production. Sensing and object classification of the surroundings of a motor vehicle while driving also promises great benefits.

Classification according to conventional classification methods has the disadvantage that, especially in borderline cases with regard to allocation of the sensed object to a class, an elevated risk of misclassification exists. In borderline cases, for example, there is a high probability that in the context of individual classification results, the object will be attributed to the wrong object class. Outliers in the context of classification of an object, resulting, e.g., from measurement errors, also have a negative effect on the stability and robustness of conventional classification methods.

The conventional methods furthermore offer only a yes/no classification of the sensed object. These results are insufficient for situations that require a more differentiated classification result, for example in the context of estimating accident hazards for a motor vehicle. One reason for this is that in the context of a classification repeated over time, an object is allocated first to one class and then, as the object is tracked, later on to a different class; this instability means that a clearly interpretable result is not supplied. Information as to how certain it is that the object might not also belong to one of the other classes would therefore be additionally important.

SUMMARY

In accordance with example embodiments of the present invention, a stabilization over time of the classification may result. According to the present invention, a confidence parameter is calculated from the quality parameters of the individual measurements, and is generally "integrated" over a certain number of time steps k and corresponding individual measurements. An abruptly large change in the confidence parameters for each object class with reference to successive time steps is thereby avoided, so that individual outliers during classification can be filtered out. A strengthening or weakening of the classification result is also effected when a subsequent classification of the result confirms or does not confirm a previous one. "Confirmation" is understood here as at least a tendency toward allocation of the object to the same class. For example, a classification with reference to an object class as the third most suitable class among ten classes can also represent a confirmation for a previous classification of the object in that class.

Because, according to an example embodiment of the present invention, the method continuously repeats, the classification result in borderline cases is stabilized to the somewhat more probable object class, so that disruptive back-and-forth jumps in the classification result are suppressed and the method is robust in terms of such disruptions.

The utilization of time-related information in the context of the present invention furthermore makes possible a more differentiated evaluation of the classification result. This kind of "final classification result," based on time-related context information and as a function of confidence parameters adapted by way of many measurements, can yield a substantially better result than a classification based on individual results.

One advantageous refinement of the example method according to the present invention is a dependence of the increase and/or decrease in the value of the respective confidence parameter on its absolute quality, the "absolute quality" of the confidence parameter being understood as its level. With a high confidence parameter, for example, a value increase can be correspondingly small so as not to create too great a difference between the confidence parameters, since too great a difference would otherwise interfere with an inherently correct correction of a misclassification.

This problem is also solved in another refinement of the method in which the permissible value range for the confidence parameters is limited.

An additional improvement to the example method according to the present invention is represented by weighted inclusion of the absolute quality of the respective individual classification results, with reference to the individual object classes, into the increase and/or decrease of the corresponding confidence parameter. The reliability of the individual results for each object class is thus also included in the classification result. A higher classification quality is the consequence.

A further advantageous method step is that of evaluative analysis of the calculated confidence parameters to determine a final, detailed classification result. It is thereby possible to arrive at more-differentiated statements regarding classification, for example the statement that the object fits badly into class A and fits very badly into all other classes. This is an improvement over the statement that "class A is the best fit."

Also advantageous are on the one hand an evaluation constituting a classification into a higher-order class in the event the classification results alternate between similar object classes (example: if the result alternates between "small car" and "large car," the final result might be the higher-order class "car"), and on the other hand an evaluation constituting a refusal to classify if the classification results jump back and forth over time between dissimilar object classes (example: if the result alternates between "truck" and "pedestrian," the final result might be "object cannot be reliably classified").

The method according to the present invention can be used, in particular, to evaluate the classification results of a classification method for objects in the surroundings of a vehicle. This can be accomplished using a computer-assisted vehicle information system that contains the following devices:

effective connections to relevant interfaces to vehicle sensor devices for sensing objects in the vehicle's surroundings;

a control circuit for analysis and classification of the sensed objects, suitable for carrying out the method according to the present invention; and effective connections to relevant interfaces to actuator devices on the vehicle.

BRIEF DESCRIPTION OF THE DRAWINGS

Example embodiments of the present invention are explained below with reference to the figures.

DETAILED DESCRIPTION OF EXAMPLE EMBODIMENTS

Figure 1:
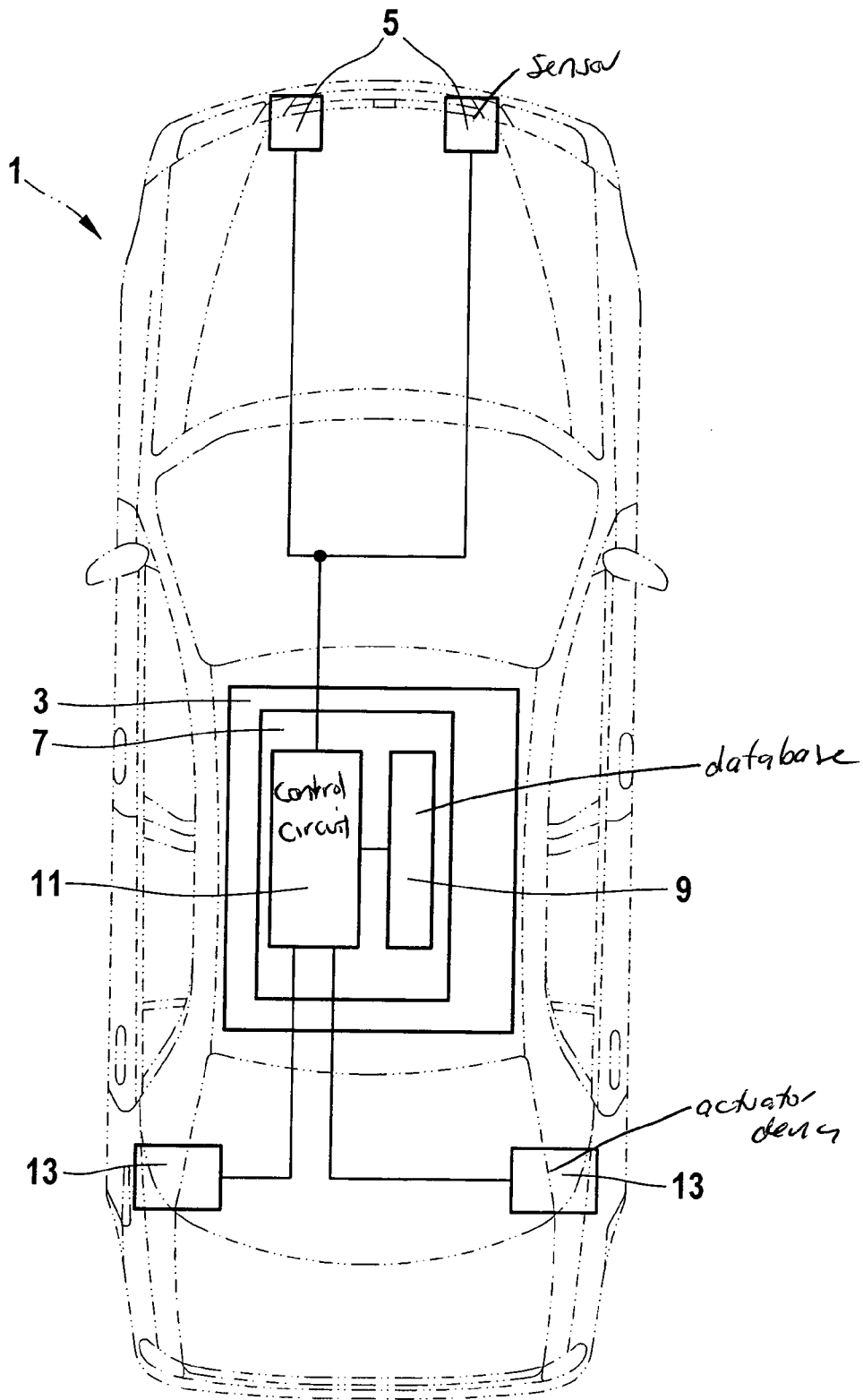
FIG. 1 is a block depiction of a computer-assisted vehicle information system set up to carry out an example embodiment of the method according to the present invention.

In the Figures, identical reference characters denote identical or identically functioning components.

Referring to FIG. 1, sensors 5 for sensing objects (e.g. trees, pedestrians, passenger cars, or trucks) in the surroundings of vehicle 1 are mounted in and/or on vehicle 1, for example a passenger car. The nature of sensors 5 can be, for example, radar, ultrasound, video in the visible and infrared region, lidar, laser, and range imager camera.

The measured data acquired by the sensors regarding a sensed object are forwarded via effective connections and interfaces (e.g. cable, radio, infrared transmission) to vehicle information system 3 integrated into vehicle 1. Vehicle information system 3 includes a computer unit 7 associated with which is a database 9 that contains data about features regarding object classes such as pedestrians, transport vehicles, and passenger cars.

Also part of computer unit 7 is a control circuit 11 for classifying the sensed objects and evaluating the classification result. Both the measured data from sensors 5 and the data about the features of the object classes required from database 9 are fed into this control circuit 11, and processed therein for classification. According to an example embodiment of the present invention, the confidence parameters, which indicate how well the sensed object matches the particular object class, are correspondingly increased or decreased in value depending on whether the previous classification is or is not confirmed, e.g., raised by three points per iteration, or lowered by three points for a decrease in value.

According to an example embodiment of the present invention, a programmed evaluative analysis of the classification result also occurs in computer unit 7. This results in a differentiated classification, for example the statement that the object fits very well into class A and fits moderately well into all other classes.

When the classification result has achieved sufficient stability over time according to an example embodiment of the present invention, specific actuator devices 13 of vehicle 1 can be triggered by control unit 7, if desired, via effective connections (e.g. cable, radio, infrared transmission); for instance, the brake can be actuated if the classification result is used, for example, in conjunction with a collision prediction and a safety system.

Figure 2:
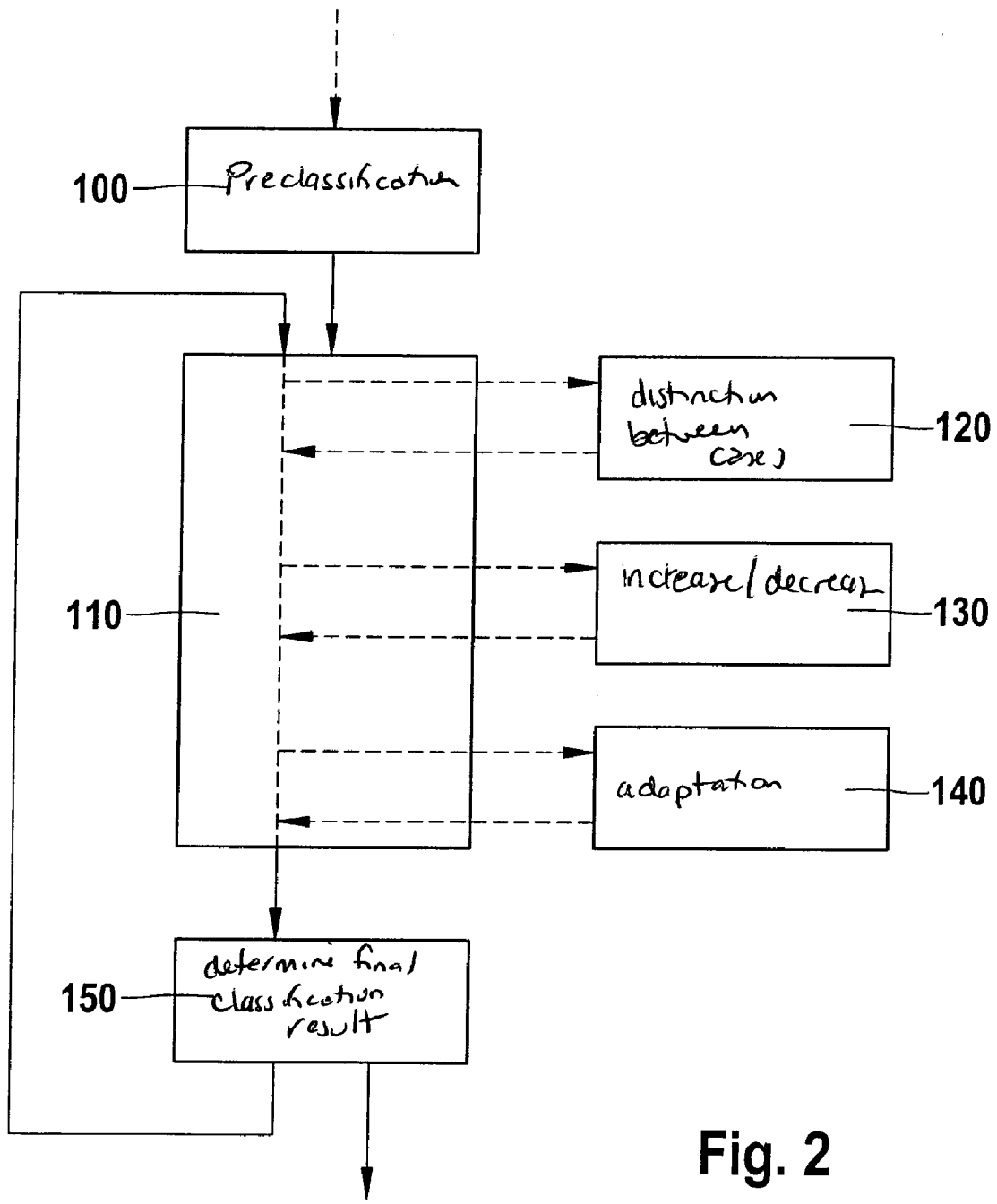
FIG. 2 is a flow chart for an example embodiment of the method according to the present invention.

FIG. 2 depicts an example embodiment of the method according to the present invention as a flow chart.

A preclassification 100, which is based on a single measurement using the aforementioned sensors and a single interpretation of the measurement results obtained therefrom, and does not yet contain any stabilization over time and does not yet represent a confidence parameter described herein, supplies, for each object to be investigated, parameter numbers constituting a "quality parameter" for matching to all the classes that are to be distinguished. Motivated by information theory, what is used in this example as the parameter is a so-called word length, which should be short in the event of a good agreement between object and class. This "classification word length" is referred to hereinafter as "$w\_i$," where i is the index for a class.

As a possible enhancement, a "rejection word length" $w\_rej\_i$ can be calculated in addition to the classification word lengths $w\_i$. This parameter refers to the question of whether the object does NOT fit into the particular object class and is to be rejected. The calculation of $w\_rej\_i$ can proceed, in principle, differently from that of $w\_i$. Both preclassification results ($w\_i$ and $w\_rej\_i$), or conversely only one of the two, are used in this example as input variables of the example method according to the present invention; i.e., the aforementioned "quality parameter" serves for calculation of the actual confidence parameter, as described in more detail below.

For the object to be classified, a so-called hypothesis exists for each of the object classes to be distinguished. Hypothesis i is "the object belongs to class i."

The probability that a hypothesis is true is evaluated using the confidence parameter "$conf\_i$." The method according to the present invention uses these confidence parameters to evaluate all the classification word lengths.

In addition to the input data mentioned above, according to the present invention the evaluation system uses the confidence parameters from previous time steps (k-1), i.e. "$conf\_i\_k-1$," for each of the individual hypotheses.

In processing step 110 (adaptation of the confidence parameters), a distinction 120 as to specific cases is made. These cases can be handled differently depending on the application, i.e., the system can in principle also be used without a distinction of cases, or with fewer or more distinctions. In this example the following three cases are distinguished:

a) The object was classified in the current time step, and not rejected.

b) The object was categorized by the classifier in the current time step as belonging to none of the object classes, and therefore rejected. This can be done, for example, by comparing the rejection word lengths $w\_rej\_i$ for all the classes with a defined rejection threshold.

c) No classification word lengths ($w\_i$ and/or $w\_rej\_i$) exist for the object in the current time step. This can be attributable to insufficient classifier input data, but can also result from deliberate lack of processing of the object. It may be useful, for example, in the interest of high processing speed, not to reclassify in the current time step an object that already has a high confidence parameter, but instead to perform the classification only on the basis of the old confidence parameters.

Case a)—The Object was Classified in the Current Time Step:

According to the classification word lengths $w\_i$, an increase in the value of the corresponding confidence parameter is performed. One possibility is to increase the value according to a quality sort of the individual hypotheses: all the word lengths w_i are sorted in ascending order, and the smallest w_i indicates class that "best matches" the object. The confidence parameters for each hypothesis are increased in value in accordance with this ranked list. The formula might be as follows:

confidence parameter for the class in first place on the list is increased in value by 5 points;
confidence parameter for the class in second place on the list is increased in value by 3 points;
confidence parameter for the class in third place on the list is increased in value by 1 point;
all other confidence parameters remain unchanged.

The number of classes to be taken into account, and the relationship among the value increases, can be selected without restriction based on the particular application.

The increase in value is additionally performed as a function of the absolute quality of the individual result. Here an additional weighting factor g_i is calculated for each class (see step 130). This factor takes into account the quality of the result for each class (i.e. the level of w_i in relation to a specific threshold). The distance from w_rej_i to the rejection threshold may be used here as an example: this distance is an indication of the evaluation "the object does not belong to any of the classes."

$$g\_i = \max(0; 1 - (w\_rej\_i / \text{rejection threshold}))$$

For objects that were classified but almost rejected, the weighting factor assumes a value close to 0. This means that the corresponding hypothesis was in fact barely confirmed, and an increase in the value of the confidence parameter is therefore not plausible. For a higher-quality result (corresponding to a greater distance from the rejection threshold), g_i approaches 1. This applies to the assumption of a positive w_rej_i.

The result for the increase in value of the confidence parameters is then: 5*g_i for the class in first place, and 3*g_i and 1*g_i correspondingly for second and third place, respectively.

Case b)—The Object was "Rejected" by the Classifier in the Current Time Step:

In the event of rejection, the confidence parameters of all the hypotheses are decreased in value: a rejection of the object means that the object cannot be allocated to any of the defined classes, and therefore none of the defined hypotheses can be supported.

Correlated with the quantitative example of a 5, 3, 1 value increase cited in case a), a value decrease of, for example, 4 for all confidence parameters can be applied in case b).

As in case a), a quality-dependent additional weighting factor g2_i is used for the value decrease in the confidence parameters for each class i (130). This factor can once again, for example, be based on the distance between the rejection word length w_rej_i and a defined rejection threshold:

$$g2\_i = \min(1; [1 - (w\_rej\_i / \text{rejection threshold})])$$

In this case g2_i assumes large values (a maximum of 1) for a large distance from the rejection threshold: the more unequivocally the object was rejected, the more the value of the confidence parameter must be decreased. For a w_rej_i close to the rejection threshold, weighting factor g2_i approaches 0 (no value decrease).

Case c)—No Classification Result Exists for the Object in the Current Time Step:

If the classification word lengths (w_i and/or w_rej_i) are absent, all the confidence parameters are decreased in value by a specific identical amount. This represents a reduction in the certainty that the hypotheses are correct. For the quantitative example being used, a decrease in the value of all confidence parameters by 1 is selected. It is obvious in this context that the absolute numbers should be coordinated with the classification iteration rate, the value range limits, and the application of the method. The iteration rate here is the frequency with which individual quality parameters are calculated, per predefined unit of time, in the aforesaid time steps k.

Here as well, it is advantageous to apply a more differentiated value decrease as a function of various cases (e.g., by asking "why was the object not classified," etc.).

Adapting the Value Range (see Step 140):

An adaptation 140 of the value range of the confidence parameters is effected by limiting them. Here as well, the absolute numbers should be coordinated with the classification iteration rate and the application of the method.

The value range does not necessarily have to be symmetrical about zero; a smaller range for negative confidence parameters and a larger range for positive ones may prove useful depending on the application. In this example a range from −20 to 200 is selected.

If the confidence parameters depart from this value range as a consequence of an increase or decrease in value, an adaptation is necessary; otherwise a classification would no longer be possible, since all (or at least several) of the hypotheses would be supported to the same extent. This can be done differently for a value range overflow and underflow. One possible adaptation is:

A value range underflow causes the confidence values to be truncated. If a confidence parameter is on the verge of dropping below this level, it is set to the minimum possible value.

A value range overflow causes the confidence parameters not to be simply truncated, but to be adapted in accordance with their relationship to one another. When a confidence parameter reaches the maximum value, for example, a value decrease can be performed for all the other confidence parameters by the same amount by which the high confidence parameter would normally be increased in value. The distance between the high confidence parameters and the other confidence parameters is thereby maintained.

The aforesaid adaptation is only an example of the plurality of possible procedures.

Determining the Final Classification Result (Step 150):

According to the present invention, a determination 150 of the classification result for the object in question is performed as the last processing step of the method according to the example embodiment. This result is ascertained on the basis of the calculated confidence parameters.

A very large number of possibilities exist here for detailed evaluation, for example:

Assign the object to the class for which the highest confidence parameter exists.

As an additional alternative: the classification result is valid only if this highest confidence parameter exceeds a given minimum threshold.

As an additional alternative: the classification result is valid only if the distance between this highest confidence parameter and the second-highest confidence parameter exceeds a defined threshold (otherwise the result is characterized as "not unequivocal").

For stabilization over time according to the present invention, the confidence parameters are temporarily stored and are used as input data for the next processing step of the method.

Figure 3:
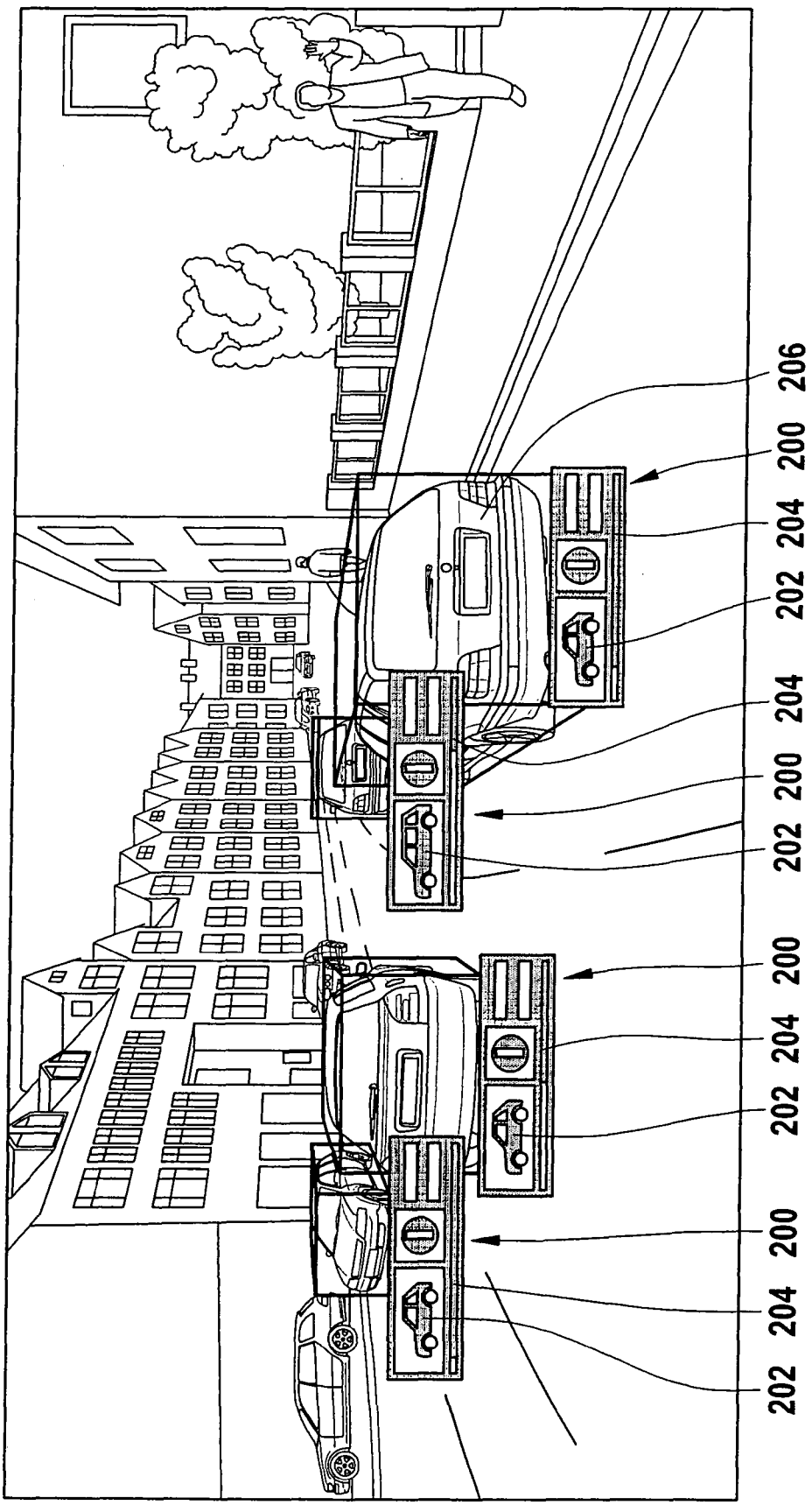
FIG. 3 is a sketch of a scene in the surroundings of a vehicle, with results from an example embodiment of the method according to the present invention.

FIG. 3 depicts a scene in the surroundings of a vehicle, showing the results of an example embodiment of the method according to the present invention. For each of the objects present in the scene (vehicles only, in this case), one of which is labeled with reference character 206, icons 200 show the class of the object by way of a symbol 202, and indicate the level of the confidence parameters using a bar 204. This depiction is not intended for the driver, but serves only for further explanation of the present invention.

Although the present invention has been described above on the basis of a preferred example embodiment, it is not limited thereto but rather is modifiable in numerous ways, e.g., the absolute magnitude of the value increase/decrease delta numbers, the iteration duration, or the limits.

The method according to the present invention can be used to improve any type of classification. The method encompasses a plurality of steps and variants that for the most part are mutually independent, and it can be flexibly configured.

Lastly, the features of the present invention can be combined with one another substantially without restriction.

What is claimed is:

1. A method for evaluation and stabilization over time of classification results from a classification method which proceeds in computer-assisted fashion, the method comprising:
    sensing, by sensors, objects to be classified over a period of time;
    repeatedly classifying the objects, by a computer processor, using specific quality parameters for each object class, wherein each classification utilizes a separate instance of sensor data obtained over the period of time by the sensors;
    increasing, by the processor, a value of a confidence parameter of an object class, the confidence parameter being calculated from the quality parameters and the increasing being conditional upon a subsequent one of the classifications confirming a result of a previous one of the classifications;
    decreasing, by the processor, the value of the confidence parameter of an object class, the decreasing being conditional upon a subsequent one of the classifications failing to confirm the result of a previous one of the classifications; and
    generating, by the processor, a final classification result including the confidence parameters that have been increased or decreased in value.

2. The method as recited in claim 1, wherein the increasing of the value is performed as a function of an absolute quality of the confidence parameter.

3. The method as recited in claim 1, wherein the decreasing in the value is performed as a function of an absolute quality of the confidence parameter.

4. The method as recited in claim 1, wherein an absolute quality of respective individual results of the classification method is included in at least one of the increase in the value of the respective confidence parameters, and the decrease in the value of the respective confidence parameter, in weighted fashion with reference to individual object classes.

5. The method as recited in claim 1, further comprising:
    limiting a permissible value range for the confidence parameters increased or decreased in value.

6. The method as recited in claim 1, further comprising:
    evaluative analyzing the calculated confidence parameter to determine a final, detailed classification result.

7. The method as recited in claim 6, further comprising:
    evaluating an alternation of the classification results between specific object classes as a classification into a higher-order class than those object classes.

8. The method as recited in claim 6, further comprising:
    evaluating an alternation of the classification results between dissimilar object classes as a rejection of a classification of the object.

9. The method as recited in claim 1, further comprising:
    evaluating classification results of the classification method for objects in surroundings of a vehicle.

10. A computer-assisted vehicle information system, comprising:
    connection interfaces to vehicle sensor devices for sensing objects in surroundings of a vehicle; and
    a control circuit configured to analyze and classify the sensed objects the control circuit configured to perform the following:
        sensing objects to be classified using sensors over a period of time;
        repeatedly classifying the objects using specific quality parameters for each object class, wherein each classification utilizes a separate instance of sensor data obtained over the period of time by the sensors;
        increasing a value of a confidence parameter of an object class, the confidence parameter being calculated from the quality parameters and the increasing being conditional upon a subsequent one of the classifications confirming a result of a previous one of the classifications;
        decreasing the value of the confidence parameter of an class, the decreasing being conditional upon a subsequent one of the classifications failing to confirm the result of a previous one of the classifications; and
        generating a final classification result including the confidence parameters that have been increased or decreased in value.

11. The vehicle information system as recited in claim 10, further comprising:
    interfaces connected to actuator devices on the vehicle.

12. The method as recited in claim 1, wherein the confidence parameters are sorted into a list according to value.

13. The method as recited in claim 10, wherein the increasing includes increasing the value of the confidence parameters by varying amounts based on a list rank of each confidence parameter.

14. The method as recited in claim 12, wherein conditional upon the confidence parameters calculated during a classification indicating that an object does not belong to any class, the confidence parameters of all classes are decreased in value.

15. The method as recited in claim 1, wherein the processor rejects the final classification result as invalid conditional upon the confidence parameter with the highest value failing to exceed a predetermined minimum threshold value.

16. The method as recited in claim 11, wherein the processor rejects the final classification result as invalid conditional upon a difference between the values of a highest confidence parameter and a second-highest confidence parameter failing to exceed a predetermined minimum threshold value.

* * * * *